(12) United States Patent
Zysko et al.

(10) Patent No.: US 6,370,949 B1
(45) Date of Patent: Apr. 16, 2002

(54) EXTREME WIND VELOCITY MEASUREMENT SYSTEM

(75) Inventors: Jan A. Zysko, Merritt Island; Stanley O. Starr, Indialantic, both of FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/408,654

(22) Filed: Sep. 14, 1999

(51) Int. Cl.[7] ............................ G01F 13/00; G01F 1/32; G01P 5/00
(52) U.S. Cl. ................................. 73/170.15; 73/861.24
(58) Field of Search ......................... 73/170.01, 170.05, 73/170.07, 170.08, 170.09, 170.11, 170.13, 170.15, 861.18, 861.21, 861.22, 861.24

(56) References Cited

U.S. PATENT DOCUMENTS

| | | |
|---|---|---|
| 4,122,712 A | 10/1978 | Thomas, Jr. et al. |
| 4,862,750 A | 9/1989 | Nice |
| 5,038,607 A | 8/1991 | Baer et al. |
| 5,223,763 A | 6/1993 | Chang |
| 5,289,726 A | 3/1994 | Miau et al. |
| 5,351,559 A | 10/1994 | Miau et al. |
| 5,421,198 A | 6/1995 | More, III et al. |
| 5,447,073 A | 9/1995 | Kalinoski |
| 5,463,904 A | 11/1995 | Kalinoski |

*Primary Examiner*—William Oen
(74) *Attorney, Agent, or Firm*—Randall M. Heald; John G. Mannix; Gary G. Borda

(57) ABSTRACT

A wind velocity measurement system employs two different principles of physics to measure wind speed: (1) the aerodynamic force imparted to a low profile, rigidly mounted cylindrical rod, and (2) the vibrating frequency of the rod as vortices are shed from the rod's cylindrical surface. A set of strain gages is used as a common sensor for both measurements, and these provide force measurements imparted by the wind on the rod. The signals generated by the strain gages are fed to processing circuitry that calculates the wind speed and direction from the signals. The force measurement is proportional to the square of the wind speed. Since it is a vector quantity, it can also be used to derive wind direction. The vortex shedding frequency is a scalar quantity and is linearly proportional to wind speed. This frequency can be calculated by analyzing the force measurements generated by the strain gages over time. Both of the wind velocity calculations can be advantageously used by the processing circuitry to generate an accurate wind velocity reading.

18 Claims, 3 Drawing Sheets

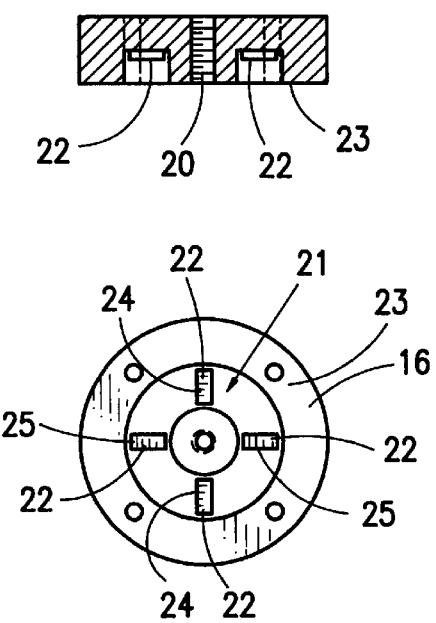
FIG. 3
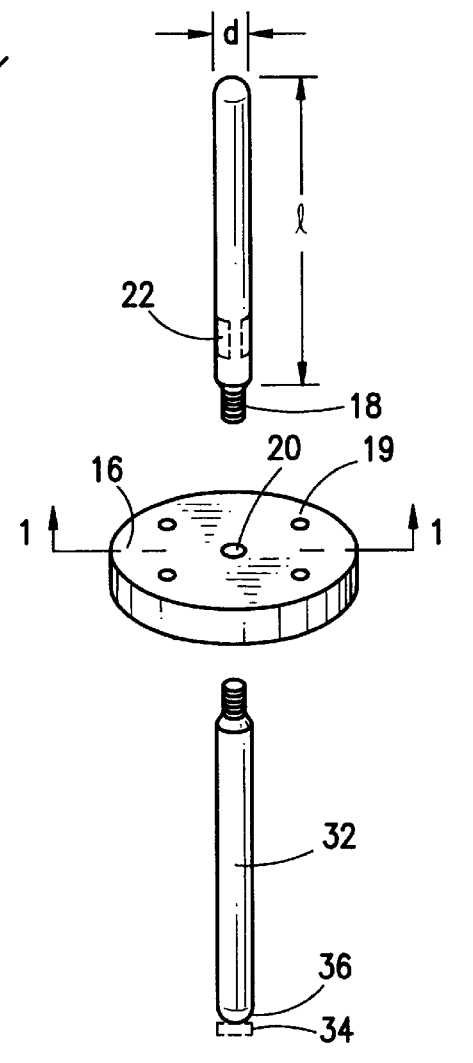
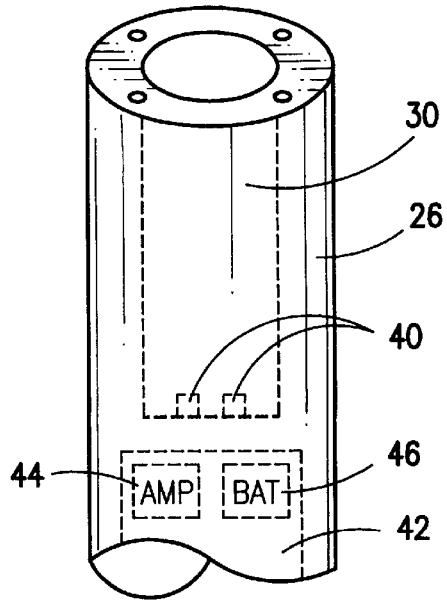
FIG. 4
FIG. 2

EXTREME WIND VELOCITY MEASUREMENT SYSTEM

ORIGINAL OF THE INVENTION

The invention described herein was made in part by an employee of the United States Government and may be manufactured and used by and for the Government of the United States for governmental purposes without the payment of any royalties thereon of therefor.

BACKGROUND OF THE INVENTION

The present invention relates to a wind velocity measurement system that is specifically designed for measuring extreme wind velocities such as may occur, for example, during a hurricane.

Accurate high-speed wind information is needed at the National Aeronautics and Space Administration's (NASA) Kennedy Space Center (KSC) to enable engineering assessment and re-certification of facilities, ground support equipment and flight hardware should an extreme wind event occur such as a hurricane, tornado or waterspout. For example, KSC has identified an operational requirement to record wind data during a hurricane under a scenario that involves a partial or complete Space Shuttle Solid Rocket Booster (SRB) stack exposed to a hurricane in the event that two complete vehicle stacks must be rolled back from the Pads in preparation for the storm. The requirement stems from a need to adequately understand and reconstruct the mechanical loads experienced by the SRB components in order to determine that the flight hardware is (or is not) safe to fly. The requirement is to capture wind pressures and directions, with a data rate of at least 50 samples per second, to facilitate reconstruction of SRB loads over the frequency range that encompasses the first and second bending modes. The National Oceanic and Atmospheric Administration (NOAA) also has a need for a wind direction and speed sensor that can be installed in the path of a hurricane to provide a reliable and accurate record of storm winds at ground level.

No commercial sensor system has been available to meet the NOAA and NASA requirements. In particular, recent studies of super storms have indicated that wind speeds in Category-5 hurricanes can exceed 200 mph while those in F-5 tornadoes can reach speeds in excess of 300 mph. The majority of conventional anemometers generally have relatively low upper speed limitations and are often hindered in performing at extremely high wind speeds because of their mass, aerodynamic drag, rotating mechanisms or sensitivity to other environmental factors such as water or acoustic noise.

More specifically, known devices for measuring wind velocity include rotating cup or propeller type anemometers, hot wire and hot film devices, acoustic anemometers and pitot type sensors. Rotating cup or propeller type anemometers have a spinning mass and high inherent aerodynamic drag that limits their high-speed performance. They also have a tendency to report winds higher than actual during the lulls in gusty conditions because the mass is slow to spin down. Hot wire and hot film devices, though low in drag, also tend to report higher than actual winds when operating in wet environments such as in hurricanes. These sensors typically do not discriminate between cooling of the sensing element due to wind or the additional cooling due to the water on the element. Acoustic anemometers, which measure wind-induced Doppler frequency shift of a locally transmitted tone, are often subject to erroneous output and signal masking due to high ambient noise levels due to turbulence at extremely high wind speeds. Single-orifice pitot type sensors, which have otherwise good high-speed performance, must be mechanically pointed into the wind. Omni-directional pitot devices are sometimes subject to water ingestion in the pressure tubes, which interferes with proper operation.

None of the foregoing wind velocity measurement devices are thus suitable for accurately measuring wind velocities over a wide range of values from relatively low speeds up to 300 mph from Category 5 hurricanes. Typically, any device that can accurately measure high-speed winds is not accurate at lower speeds, while those that are accurate at lower speeds cannot typically endure higher speed winds. A need therefore exists for a wind velocity measurement system that is rugged enough and accurate enough to be able to measure extremely high wind velocities, while at the same time possessing good low speed measurement sensitivity.

SUMMARY OF THE INVENTION

To address the foregoing need, the present invention provides a wind velocity measurement system that employs two different types of measurement techniques, both of which receive signals from a single measurement sensor. More particularly, the subject wind velocity measurement system employs the following different principles of physics to measure wind speed: (1) the aerodynamic force imparted to a low profile, rigidly mounted cylindrical rod, and (2) the vibrating frequency of the rod as vortices are shed from the rod's cylindrical surface. In the preferred embodiment, a force sensor comprising a common set of strain gages is used for both measurements, and the strain gages generate signals in response to the force imparted by the wind on the rod. The signals generated by the strain gages are fed to processing circuitry that calculates the wind speed and direction from the signals. The force measurement is proportional to the square of the wind speed. Since it is a vector quantity it can also be used to derive wind direction. The vortex shedding frequency is a scalar quantity and is linearly proportional to wind speed. This frequency can be measured directly or calculated by analyzing the force measurements generated by the strain gages over time. Both of the wind velocity calculations can be advantageously used by the processing circuitry to generate an accurate wind velocity reading. In addition, the two measurements derived from the same sensor signals can be compared to one another to facilitate automatic checking of sensor calibration.

BRIEF DESCRIPTION OF THE DRAWINGS

The features and advantages of the present invention will become apparent from the following detailed description of a preferred embodiment thereof, taken in conjunction with the accompanying drawings in which:

FIG. 2 is an exploded view of the probe of FIG. 1;

FIG. 3 is a cross sectional view taken along line 1—1 of a strain gage base plate that forms a part of the probe of FIG. 2;

FIG. 4 is a bottom view of the strain gage base plate; and

DETAILED DESCRIPTION OF A PREFERRED EMBODIMENT

Figure 1:
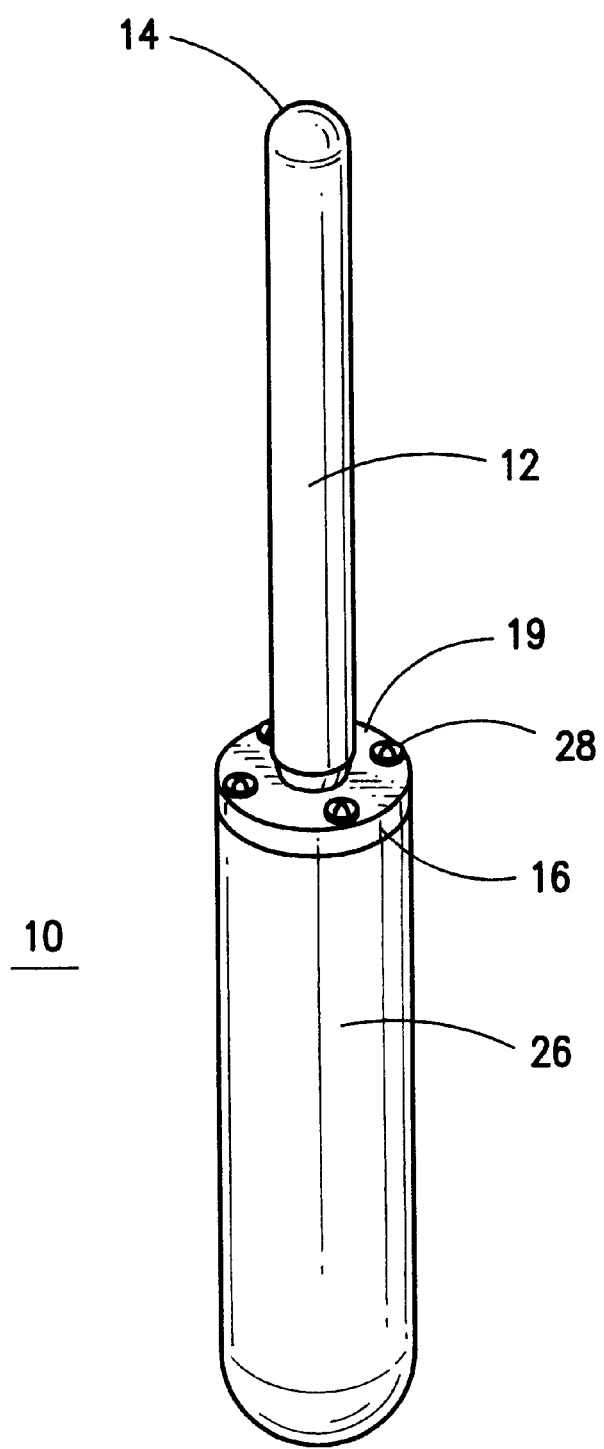
FIG. 1 is a perspective illustration of a wind velocity measuring probe that is employed in a preferred embodiment of the present invention.

Before the mechanical structure and processing circuitry for a preferred embodiment of the present invention will be described, a discussion of the invention's operational theory will be presented. The present invention measures wind velocity by sensing forces imparted by the wind on a cylindrical rod. The drag forces induced by a cylinder in a cross flow are well understood and are a function of the Reynolds number (Re). In addition, over a certain range of Re, vortices are periodically shed from either side of the cylinder, thereby giving rise to a side-to-side periodic force. Both of these parameters, drag force and vortex shedding frequency, are used in the present invention to infer wind speed. Each of these is described in detail next.

The forces imparted on a cylinder due to aerodynamic drag are basically of the form:

$$F = \tfrac{1}{2} \cdot C_d \cdot \rho \cdot l \cdot d \cdot V^2$$

where $C_d$ is the drag coefficient of the cylinder; $\rho$ is the density of the fluid, l and d are the length and diameter of the cylinder respectively, and V is the free stream velocity of the fluid. Since the force (F) acting on the cylinder is proportional to the square of the wind speed (V), signal level (hence system accuracy and mechanical response) increases with increased wind velocity.

If one were to measure the force (F) while knowing the other parameters, the velocity (V) could then be derived by:

$$V = [2 \cdot F / C_d \cdot \rho \cdot l \cdot d]^{1/2}$$

If the force due to the wind on a vertically mounted cylinder is measured in two axes (say North-South and East-West), one now has an instrument that measures the vector components of the local wind. Using a rectangular to polar coordinate system conversion, both wind speed and direction can be inferred.

Under the theory of vortex shedding, the lift of a cylinder can vary as a sinusoid in time, even though the lift is zero averaged over time. This variation in lift is called vortex shedding because the cylinder drag produces attached vortices first on one side, then on the other (in the opposite sense) which become detached from the cylinder and travel downstream in an alternating pattern. This pattern is called a vortex street. The vortex shedding produces an alternating lift force, which is then superimposed on the low frequency drag. The vortices are shed at a rate given by a dimensionless parameter called the Strouhal number (S). This is given by:

$$S = f_v \cdot d / V$$

where $f_v$ is the vortex shedding frequency

Thus, the wind velocity V is linearly proportional to the vortex shedding frequency, and is given by:

$$V = f_v \cdot d / S$$

It is found experimentally for a cylinder in a cross flow, that S rises with increasing Re, but then becomes flat above Re=1000, and in that range S equals approximately 0.21. It is also found that the strength of vortex shedding increases with Reynolds number although the oscillation sinusoid of vortex shedding can be partially distorted with increasing turbulence in the fluid which begins to occur above Re=1500.

Each of the foregoing wind velocity measurement techniques possesses notable advantages. The drag force technique has good response and superior accuracy at high speeds, and can also be used to determine wind direction when orthogonal sensing devices are employed. This technique is also accurate at low wind speeds, and because of its fast response, wind gusts in turbulent conditions are readily discernable. The vortex shedding frequency technique offers consistent resolution and accuracy over the speed range of interest because of the linear relationship between wind velocity and vortex shedding frequency. In addition, because each measurement is made based on signals from a common sensor, the two measurements can be used to detect when the sensing devices are out of calibration. In particular, if one or more of the strain gages is damaged or goes out of calibration, the drag force measurement will be erroneous, however, the vortex shedding frequency measurement may not be affected. This would be evidenced by notably different wind velocity measurements being generated by the two techniques. Thus, by comparing the two measurements for widely differing values, an out-of-calibration condition can be detected and recorded. In addition, only a single strain gage is needed to determine the vortex frequency. Hence, speed is readily determined from a single sensor even if its force calibration has changed significantly. The two measurement techniques thus compliment one another well, and the present invention makes use of both techniques to provide an optimum wind velocity measuring system that can be used to generate accurate measurements of wind speed over a wide range of speeds, and in any condition.

With reference now to FIGS. 1–4, a wind velocity sensing probe 10 is illustrated that is employed in a preferred embodiment of the present invention to obtain wind induced drag force and vortex shedding frequency measurements. The mechanical form of the probe 10 is somewhat critical in design. Because the device must be omni-directional in the azimuth plane, it must be symmetric about the vertical axis and must have consistent drag characteristics over the speed range of interest. Also one needs to consider structural requirements, mechanical resonance, environmental conditions, and sensitivity when selecting the material type diameter and length.

With these considerations in mind, the preferred design of the high-speed device is a vertically mounted, cylindrical rod 12, with an exposed top end 14 being hemispherical in shape so as not to produce any undesirable turbulence and vortices. The rod 12 is attached by any suitable means to a circular base plate 16 that is preferably constructed of a material such as stainless steel, having good strain characteristics. In the preferred embodiment, the rod 12 has a threaded lower end 1 8 that is attached to a top side 19 of the base plate 16 by being threaded into a centrally located threaded aperture 20 in the base plate 16. With this arrangement, the resulting force of the wind can be measured by measuring either the bending moment of the rod 12 or the bending torque in the attachment point of the base plate 16. This is done with a force sensor 21 comprised of four strain gages 22 that are mounted symmetrically every 90 degrees in cruciform fashion on, or embedded in, a bottom side 23 of the base plate 16. Alternatively, the strain gages 22 can be mounted on or embedded in the side of the rod 12 as illustrated by the dashed lines in FIG. 2, and again, would be spaced 90 degrees apart from one another.

The purpose of the 90 degree spacing of the strain gages 22 is to provide orthogonal force measurements that can be used with vector analysis to determine wind direction. More particularly, the strain gages 22 are configured in a wheatstone bridge arrangement, with each axis having its own strain gage pair. Thus the strain gages are grouped into a first pair 24 (e.g., North-South) and a second pair 25 (e.g., East-West). In this configuration, the total force applied to the rod 12 can be resolved by vector addition of the individual component forces. The specific types of strain gages are not germane to this technology and may range from high-output piezoelectric to purely resistive gages. Each has its own advantages and disadvantages and the selection is left to the designer. Similarly, there are alternate methods of strain gage mounting (embedded vs. surface mounted) or bridge excitation (constant-current vs. constant-voltage source). Other types of strain gage technology such as fiber-optics based instrumentation or the "Anderson Current Loop" are also viable means of measuring the resulting aerodynamic loads. Temperature compensation of the strain gages is also highly recommended.

The dimensions of the rod 12 are very important to insure that the probe 10 will be able to sense a wide range of wind speeds from approximately 30–300 mph for a high speed application. If the rod 12 is too long or too thin, it will not be able to withstand hurricane force winds. On the other hand, if the rod 12 is too thin and/or too short, it will not be responsive enough to lower wind velocities. With these considerations in mind, the rod diameter (d) is selected so that, over the desired wind speed range, the Reynolds number Re falls in the range required for steady drag and the Strouhal number is constant. The rod length (1) is selected, along with the thickness of the base plate 16, to provide a desirable range of strain values. It is well known that the drag coefficient of a cylinder is relatively constant ($C_d$=1.2) over a Reynolds number between $1 \times 10^4$ and $2 \times 10^5$. This dictates the diameter (d) of the rod 12 be no larger than 0.75 inches for employment in a maximum wind speed of 300 mph and no smaller than 0.375 inches for adequate response in the low speed regime of about 30 mph. An overall length of 3–5 inches yields acceptable overall sensitivity with a relatively small physical profile and structurally manageable moments at the base. A drag force of approximately 2.2 lbs. will result when a 300 mph wind loads a ⅜ inch diameter rod with a 3 inch length in air at standard conditions (density= 0.00238 slugs/ft³). Since this load is equivalent to 2.2 lbs. acting at ½ the height of the rod, the resulting moment at the base of the rod would then be approximately 3.3 in·lbs. (2.2×1.5). For low speed application, the physical dimensions of the rod diameter and length would be increased for optimal output over the speed range of interest.

As the mass of the rod 12 inversely affects the natural frequency response of the probe 10, it too is an important factor in the system design since this has an effect on the vortex shedding frequency measurements. The mass of the rod 12, thickness of the base plate 16 and the application of damping, are selected to minimize the effect of modal resonance on the measured vortex frequencies. Damping is also important to minimize fatigue of the base plate 16 due to the accumulated strains of each oscillation. Mechanical damping of the modal frequencies is desirable, especially if they fall within the range interest. Damping reduces the peak response of the probe 10 and tends to spread the peak thereby enhancing the signal due to vortex shedding.

This damping can be provided by one of two methods. The base plate 16 is attached to a base housing 26 by any suitable means, such as with a plurality of screws 28. The base housing 26 includes a chamber or reservoir 30 for reception of a second rod 32 that is attached to the bottom side 23 of the base plate 16, and is a mirror image of the rod 12. To provide the necessary damping, the chamber 30 is preferably filled with a viscous rheological material. Alternatively, a conducting plate 34 can be mounted to a bottom end 36 of the second rod 32, and is spaced by a small air gap from a plurality of fixed magnets 40 that provide eddy current damping. Viscous damping provides more effective damping but also reduces the basic sensitivity of the probe 10. This increases the wind speed at which a reliable wind speed and direction can be determined using the low frequency data.

The base housing 26 also includes a lower chamber 42 for reception of electronic components including an amplifier circuit 44. The amplifier circuit 44 is employed to amplify the relatively low output strain gage signals to a level suitable for signal processing and ultimately for data recording. In order to minimize electrical noise pick-up and strain gage lead length-induced errors, the amplifier circuit 44 is thus kept in close proximity to the strain gages 22 by being housed in the lower chamber 42. A power supply 46, which is preferably a battery pack, is located externally of probe 10 and is in electrical communication with probe 10 for powering strain gages 22 and amplifier circuit 44.

The electronic signals from the strain (gages 22 contain two distinct components: first, static strain due to the drag of the rod 12, which is proportional to the square of the wind velocity: and, second, an oscillatory signal due to the vortex shedding, which is proportional to the first power of the velocity. A signal processing technique is employed that allows the two independent indications of wind velocity to be separated to form an optimal estimate of the wind speed and direction (vector) in the plane of the base plate 16. In particular, the determination of wind speed, as estimated from the vortex shedding frequency, requires a time series of sampled strain gage data. The data sampling is performed by an analog to digital converter (A/D) which samples at a sufficiently high frequency to capture vortex shedding frequencies related to the highest wind velocity to be measured and the probe diameter. The analog signal must be filtered prior to digitization to eliminate a number of low frequency energy sources not associated with the vortex shedding signal, and to preclude the aliasing of higher than sampled frequencies into the power spectrum of desired frequencies.

Figure 5:
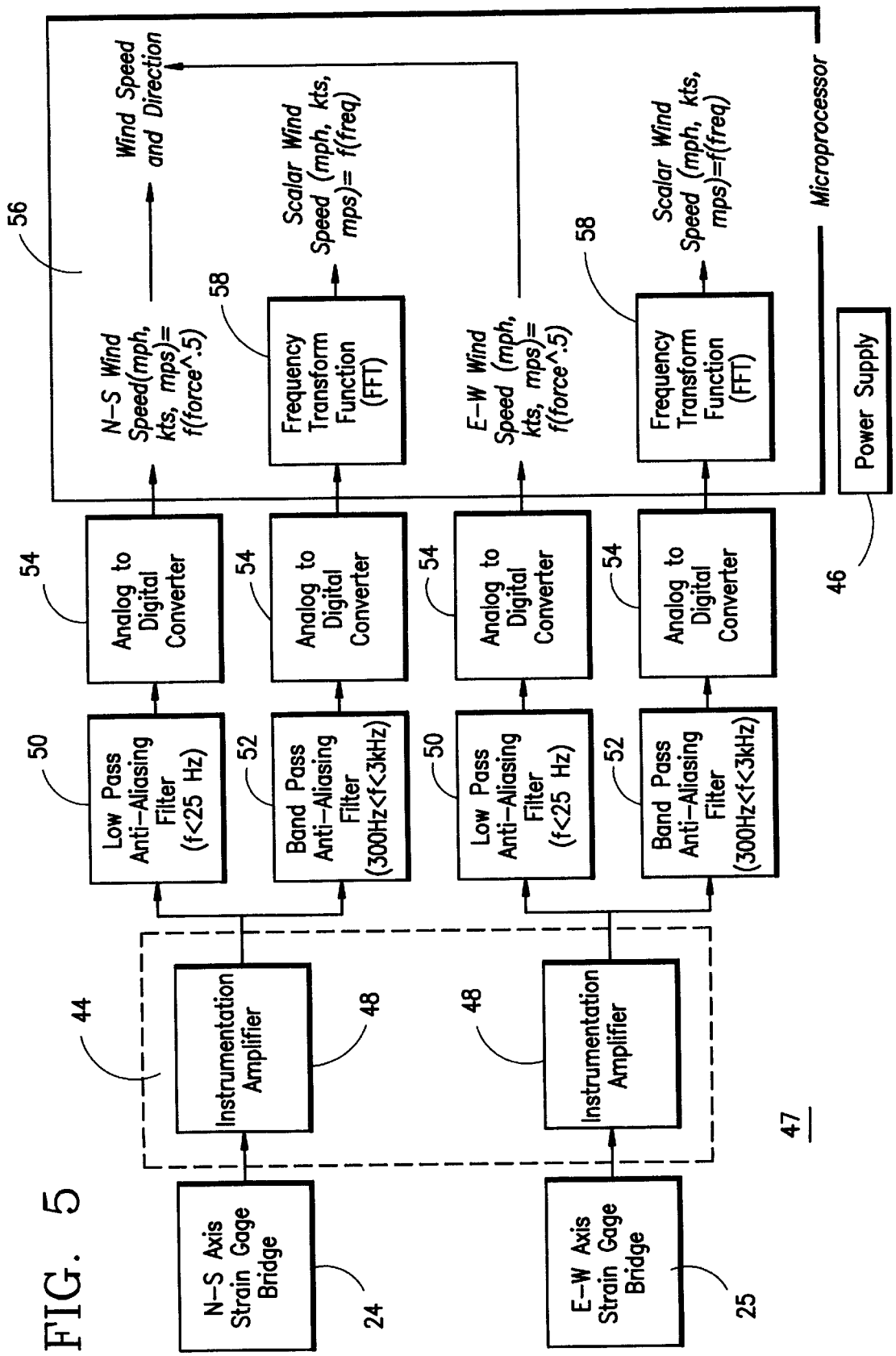
FIG. 5 is a block diagram of a wind measurement system that makes use of the wind velocity measuring probe of FIG. 1, and comprises a preferred embodiment of the present invention.

With reference now to FIG. 5, a wind velocity measurement system 47 is illustrated which is constructed in accordance with the preferred embodiment of the invention, and includes processing circuitry for carrying out the foregoing functions. Each of the two strain gage bridge pairs 24 and 25 has its output connected to a corresponding one of two instrumentation amplifiers 48 in the amplifier circuit 44. Purely resistive gages will typically require an amplifier gain of at least 100 for each axis. For best common mode noise rejection and maximum sensitivity, it is preferable that the instrumentation amplifiers 48 have differential inputs. The amplifiers 48 also need to be responsive over a frequency range from DC to the highest vortex shedding frequency expected at the highest operating speed. The DC capability is necessary to accurately measure the steady-state force component of the wind. The highest vortex shedding frequency expected is approximately 3,000 Hz for a ⅜ inch diameter rod in a 300 mph steady-state wind. The required sampling frequency is determined by the highest frequency desired in the signal and is at least double that frequency in accordance with the Nyquist theorem. This dictates that the sample rate must be at least twice the desired signal frequency in order to faithfully reconstruct a signal of a certain frequency using sampled data. Typical vortex shedding frequencies associated with this sensor will fall in the range of 300 to 3000 Hz, so that the sampling rate should be on the order of 6000 Hz.

With the foregoing criteria in mind, each of the signals from the two amplifiers 48 represents a corresponding channel in the system 47. These signals are fed both into a corresponding one of two low pass anti-aliasing filters 50, and also into a corresponding one of two band pass anti-aliasing filters 52. The low pass filters 50 are selected to pass only signals below 25 Hz. These are required to filter out any high frequency energy sources, such as vortex frequencies or the rod's natural resonance frequency, from the DC components of the signals that are employed for measuring the steady-state (low frequency) aerodynamic load for the velocity vector calculation. The vortex band pass filters 52 are selected to pass frequencies above 300 Hz, but below 3000 Hz, which are the portions of the signals that are required for making the vortex shedding frequency measurements. The high pass portion for each of the filters 52 is needed to filter out the steady-state load components and any resonant frequency vibrations that are below the vortex frequency band of interest. Offending frequencies may also include electronic noise, modal responses of the sensor due to base motion, gusts and other slow variations of the wind.

The four filtered signals from the low pass and band pass filters 50 and 52 are next each fed into a corresponding one of four analog to digital (A/D) converters 54. The A/D converters 54 provide a digital representation of the analog time series for the microprocessor analysis of the aerodynamic load measurement and the vortex shedding frequency for the two methods of wind speed determination. For ample resolution, especially at the lower speeds, it is recommended that the A/D converters 54 have at least 12-bit resolution.

Finally, the digitized time series data are fed into a microprocessor 56 that is programmed to perform numerous functions. In particular, the time series data contains noise, modal responses of the sensor, and the aerodynamic signal containing both vortex shedding and turbulence responses of the sensor. The microprocessor 56 performs algorithms to estimate the vector wind from the force data and the peak frequency response in the time series as an estimator of the vortex shedding frequency.

The vector wind speed algorithm carried out by the microprocessor 56 basically solves the aerodynamic load (force) equation for velocity in each axis after applying the proper calibration coefficients. The microprocessor 56 converts the digital representation of strain gage voltage to load and then to speed. Speed in each axis is then converted to a resultant wind speed and direction.

The algorithm to extract the vortex frequency is simply the least Fourier Transform (FFT) as indicated at 58 that is applied to selected blocks of data followed by a search for the frequency with the highest energy component. The frequency of maximum energy is the estimator of the vortex shedding frequency. In a real measurement situation, however, the sensor 21 will receive excitation from turbulence, rain impact, base motion, background sound and other sources, which can enhance the energy around the modal peaks in the mechanical response of the sensor 21. At lower wind speeds, the vortex shedding frequency tends to be masked by these interference sources so that the estimate of frequency has low reliability. The energy of this component is then compared with the average energy across the spectrum to determine the significance of this peak above background. This ratio is a confidence measure of the signal.

Each channel of the system 47, E-W and N-S, provides an analyzed signal. The algorithm analyzes the time series from both strain gage pairs 24 and 25 over the same time interval. Depending on the wind direction, the vortex shedding signal from one of the strain gage pairs 24 or 25 will typically be higher than the other, while the background noise levels are comparable. The microprocessor 56 selects the value of vortex shedding to record or display, based on the highest confidence level received. The data output of the microprocessor 56, related to vortex shedding, is the time code, the estimate of vortex shedding frequency, the confidence ratio and the channel providing this best estimate.

The microprocessor 56 may also be used to provide the time series averages necessary for meteorological applications. As an example, sustained winds would be computed from averaging the sampled instantaneous winds over a one-minute period. The peak wind gust would be derived from the peak 1-second wind observed during the 1-minute period.

Comparison of the magnitude of the vector wind (as derived from the force measurements) with the scalar wind magnitude (as derived from the vortex frequency) would serve as a qualitative check on the performance of the system. Errant force data from strain gages that have shifted in calibration or whose substrate has been over-stressed would still produce a reliable frequency measurement. This condition would be readily apparent when the two wind derivations are compared. During such a condition, the vector wind data (magnitude and direction) would be suspect. The scalar wind data, though of lesser quality, could still be obtained from the vortex shedding frequency measurements.

In conclusion, the subject invention provides a highly rugged and reliable means to measure extremely high wind velocities, which is capable of these measurements without moving parts or open ports. The invention can be self contained, with battery power, thus enabling the instrument to be independent of line power, which is unreliable in a major storm, and allows the design to be highly immune to lightning induced damage and to be mechanically rugged. The invention provides an innovative approach to combining two different drag forces (oscillatory and static) to derive an optimal estimate of wind speed components. In addition, the innovative strain gage platform design allows the measurement of bending forces only and thereby provides a decoupling of the two orthogonal components of wind pressures to derive accurate estimates of each (x and y) component.

It should also be noted that while the present invention is designed particularly for use as a wind speed sensor, it could also be employed as an airspeed sensor on an aircraft. In this application, the direction sensing feature of the sensor could also be employed for calculating angle of attack on an airplane if mounted on the side of the aircraft normal to the wind flow, or, angle of side-slip if mounted on top of the aircraft normal to the wind flow.

Although the invention has been disclosed in terms of a preferred embodiments it will be understood that numerous variations and modifications could be made thereto without departing from the scope of the invention as defined in the following claims.

What is claimed is:

1. A system for measuring wind velocity comprising:
   a) a vertically positioned cylindrical rod to be exposed to a wind whose velocity is to be measured;
   b) a force sensor for measuring wind induced bending forces imparted to said rod and generating force responsive signals in response thereto;
   c) means for generating a first wind velocity calculation from drag force measurements derived from said signals;
   d) means for calculating a vortex shedding frequency from said signals; and
   e) means for generating a second wind velocity calculation from said vortex shedding frequency.

2. The system of claim 1, wherein said force sensor further comprises first and second strain gage pairs for sensing forces imparted on said rod from orthogonal directions and generating first and second force responsive signals in response thereto; and, said system further comprises:

f) means for determining, from said signals generated by said first and second pairs of strain gages, direction of a wind incident on said rod.

3. The system of claim 2, wherein said strain gage pairs are disposed on an outer surface of said rod.

4. The system of claim 2, wherein said rod is attached at a bottom end to a base, and said strain gage pairs are disposed on said base.

5. The system of claim 2, further comprising:

g) first and second low pass filters for filtering said first and second signals generated by said first and second strain gage pairs to form first and second low pass filtered signals to be used by said means for generating said first wind velocity calculation from drag force measurements; and h) first and second band pass filters for filtering said first and second signals generated by said first and second strain gage pairs to form first and second band pass filtered signals to be used by said means for calculating a vortex shedding frequency.

6. The system of claim 5, wherein said system further includes:

i) a plurality of analog to digital converters for digitizing said low pass and band pass filtered signals; and j) a microprocessor for receiving said digitized filtered signals, wherein said means for generating a first wind velocity calculation, means for calculating a vortex shedding frequency from said signals, and means for generating a second wind velocity calculation, further comprise algorithms that are implemented by said microprocessor.

7. The system of claim 6, wherein said algorithms include a Fast Fourier Transform algorithm to calculate said vortex shedding frequency from said band pass filtered signals.

8. The system of claim 2, further comprising:

g) a housing on which said cylindrical rod and said strain gage pairs are disposed;

h) an amplifier circuit disposed in said housing for amplifying said signals generated by said strain gage pairs; and i) a battery power supply for powering said strain gage pairs and said amplifier circuit.

9. The system of claim 1, further including means for comparing said first and second wind velocity calculations to determine whether said strain gage pairs are functioning properly.

10. The system of claim 1, further comprising:

g) a housing having a chamber disposed therein;

h) a base plate attached to said housing, said base plate having a top side and a bottom side, with said cylindrical rod having a bottom end attached to said top side of said base plate;

i) a second cylindrical rod attached at a first end to said bottom side of said base plate and being disposed in said chamber; and j) means for dampening movement of said second cylindrical rod.

11. The system of claim 10, wherein said means for dampening comprises a viscous material disposed in said chamber.

12. The system of claim 10, wherein said means for dampening comprises a magnet disposed in said chamber beneath a second end of said second rod, and a conducting plate disposed on said second end.

13. The system of claim 1, wherein said rod has a diameter of between 0.375 and 0.750 inches, and a length of between 3 and 5 inches.

14. A method for measuring wind velocity comprising:

a) positioning a cylindrical rod vertically in a wind whose velocity is to be measured;

b) providing a force sensor for sensing wind induced bending forces imparted to said rod and generating force responsive signals in response thereto;

c) generating a first wind velocity calculation from drag force measurements derived from said signals;

d) calculating a vortex shedding frequency from said signals: and e) generating a second wind velocity calculation from said vortex shedding frequency.

15. The method of claim 14, wherein said force sensor further comprises first and second strain gage pairs for sensing forces imparted on said rod from orthogonal directions and for generating first and second force responsive signals in response thereto, and said method further comprises the step of determining, from said first and second signals generated by said first and second pairs of strain gages, the direction of wind incident on said rod.

16. The method of claim 15, wherein said steps of generating a first wind velocity calculation from drag force measurements derived from said signals, calculating a vortex shedding frequency from said signals, and generating a second wind velocity calculation from said vortex shedding frequency further comprise the steps of:

1) low pass filtering said first and second signals generated by said first and second strain gage pairs to form first and second low pass filtered signals;

2) band pass filtering said first and second signals generated by said first and second strain gage pairs to form first and second band pass filtered signals;

3) employing said low pass filtered signals for generating said first wind velocity calculation from drag force measurements; and 4) employing said band pass filtered signals for calculating said vortex shedding frequency.

17. The method of claim 16, further comprising the steps of digitizing said filtered signals, and providing a microprocessor for employing said digitized signals with a first algorithm for generating said first wind velocity calculation from said low pass filtered signals, and a second algorithm employing a Fast Fourier Transform to calculate said vortex shedding frequency from said band pass filtered signals.

18. The method of claim 15, further comprising the steps of comparing said first and second wind velocity calculations, and determining whether said strain gage pairs are properly functioning from the results of said comparison.

* * * * *